United States Patent
Kurata et al.

(10) Patent No.: US 10,600,411 B2
(45) Date of Patent: *Mar. 24, 2020

(54) APPROACH TO REDUCING THE RESPONSE TIME OF A SPEECH INTERFACE

(71) Applicant: INTERNATIONAL BUSINESS MACHINES CORPORATION, Armonk, NY (US)

(72) Inventors: Gakuto Kurata, Tokyo (JP); Tohru Nagano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,154

(22) Filed: Oct. 6, 2017

(65) Prior Publication Data

US 2018/0033433 A1 Feb. 1, 2018

Related U.S. Application Data

(63) Continuation of application No. 15/010,725, filed on Jan. 29, 2016, now Pat. No. 9,922,647.

(51) Int. Cl.
 *G10L 15/08* (2006.01)
 *G10L 15/22* (2006.01)
 (Continued)

(52) U.S. Cl.
 CPC .............. *G10L 15/22* (2013.01); *G10L 13/00* (2013.01); *G10L 15/28* (2013.01)

(58) Field of Classification Search
 CPC ......... G10L 15/22; G10L 15/04; G10L 15/05; G10L 15/06; G10L 15/063; G10L 15/08;
 (Continued)

(56) References Cited

U.S. PATENT DOCUMENTS 5,749,099 A * 5/1998 Voorhees ................ A61F 11/06
128/866
7,716,056 B2 * 5/2010 Weng ....................... G10L 15/22
704/10
(Continued)

FOREIGN PATENT DOCUMENTS

JP 920150116 10/2017

OTHER PUBLICATIONS

JP920150116US1, Jan. 29, 2016, U.S. Appl. No. 15/010,725.
(Continued)

*Primary Examiner* — Vijay B Chawan
(74) *Attorney, Agent, or Firm* — Tutunjian & Bitetto, P.C.; Vazken Alexanian (57) ABSTRACT

A method for reducing response time in a speech interface including constructing a partially completed word sequence from a partially received utterance from a speaker received by an audio sensor, modeling a remainder portion using a processor based on a rich predictive model to predict the remainder portion, and responding to the partially completed word sequence and the predicted remainder portion using a natural language vocalization generator with a vocalization, wherein the vocalization is prepared before a complete utterance is received from the speaker and conveyed to the speaker by an audio transducer.

20 Claims, 7 Drawing Sheets

(51) Int. Cl.
*G10L 13/00* (2006.01)
*G10L 15/28* (2013.01)

(58) Field of Classification Search
CPC ..... G10L 15/083; G10L 15/18; G10L 15/187; G10L 15/222; G10L 15/26; G10L 15/265; G05F 17/278; G05F 17/30427
USPC ....... 704/254, 255, 206, 231, 244, 246, 250, 704/251, 270
See application file for complete search history.

(56) References Cited

U.S. PATENT DOCUMENTS

| | | | | |
|---|---|---|---|---|
| 8,903,793 | B2* | 12/2014 | Bangalore | G06F 17/30864 707/706 |
| 9,196,244 | B2 | 11/2015 | Wong et al. | |
| 9,514,747 | B1 | 12/2016 | Bisani et al. | |
| 2006/0074670 | A1* | 4/2006 | Weng | G06F 17/278 704/257 |
| 2010/0088098 | A1* | 4/2010 | Harada | G10L 15/10 704/254 |
| 2012/0216134 | A1 | 8/2012 | Neubacher et al. | |
| 2013/0151486 | A1* | 6/2013 | Narasimhan | G06Q 30/02 707/694 |
| 2014/0164533 | A1* | 6/2014 | Lynch | H04L 12/1822 709/206 |
| 2014/0337370 | A1* | 11/2014 | Aravamudan | G10L 25/54 707/759 |
| 2015/0100316 | A1* | 4/2015 | Williams | G10L 15/04 704/240 |
| 2015/0134332 | A1* | 5/2015 | Liu | G10L 15/187 704/243 |
| 2015/0170638 | A1* | 6/2015 | Bezar | G10L 17/26 704/246 |
| 2017/0206805 | A1* | 7/2017 | Salamini | G09B 19/04 |
| 2017/0221486 | A1* | 8/2017 | Kurata | G10L 13/00 |

OTHER PUBLICATIONS

List of IBM Patents or Patent Applications Treated as Related dated Oct. 6, 2017, 2 pages.
Baumann, "Real-Time End-to-End Incrementality in Spoken Dialog Systems", www.informetik.uni-hamburg.de, University of Potsdam, 2011, pp. 49.

* cited by examiner

APPROACH TO REDUCING THE RESPONSE TIME OF A SPEECH INTERFACE

BACKGROUND

Technical Field

The present invention relates to a speech interface, and more particularly to a system and method for a speech interface with a reduced response time.

Description of the Related Art

In various environments, automatic speech recognition is used to recognize utterances from a user and provide responses to help automate and speed up user-machine interactions. In some instances, the automatic speech recognition (ASR) and responses are slow, unstable, and/or inconsistent in the responses. The response time of a speech recognition system can be important to the usability of a speech interface. It would therefore be beneficial to have a system that can accurately identify what a user is saying and prepare an acceptable response in a timely manner.

SUMMARY

An aspect of the disclosure relates to a method for reducing response time in a speech interface including constructing a partially completed word sequence from a partially received utterance from a speaker received by an audio sensor, modeling a remainder portion using a processor based on a rich predictive model to predict the remainder portion, and responding to the partially completed word sequence and the predicted remainder portion using a natural language vocalization generator with a vocalization, wherein the vocalization is prepared before a complete utterance is received from the speaker and conveyed to the speaker by an audio transducer.

Another aspect of the disclosure relates to a non-transitory computer readable storage medium comprising a computer readable program for reducing response time in a speech interface, wherein the computer readable program when executed on a computer causes the computer to perform the steps of constructing a partially completed word sequence from a partially received utterance from a speaker received by an audio sensor, modeling a remainder portion using a processor based on a rich predictive model to predict the remainder portion, and responding to the partially completed word sequence and the predicted remainder portion using a natural language vocalization generator with a vocalization, wherein the vocalization is prepared before a complete utterance is received from the speaker and conveyed to the speaker by an audio transducer.

Another aspect of the disclosure relates to a system for reducing response time in a speech interface including an automatic speech recognition detector including a processor configured to construct a partially completed word sequence from a partially received utterance from a speaker received by an audio sensor, a word predictor configured to model a remainder portion using a processor based on a rich predictive model to predict the remainder portion, and a natural language vocalization generator configured to respond to the partially completed word sequence and the predicted remainder portion using a natural language vocalization generator with a vocalization, wherein the vocalization is prepared before a complete utterance is received from the speaker and conveyed to the speaker by an audio transducer.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Principles and embodiments of the present disclosure relate generally to a method and system for reducing the response time of a speech interface. To reduce the response time of a speech interface, automatic speech recognition may be combined with natural language understanding operating on the results of the automatic speech recognition. The speech interface may respond to a person's questions and statements in a manner that provides a more natural interaction experience.

In various embodiments, a speech interface may include automatic speech recognition (ASR), natural language processing (NLP), and natural language understanding (NLU) to provide automatic voice interaction with a person and improved human-machine interaction. An automatic speech recognition system may receive a stream of sounds from a user and recognize a sequence of words from the stream of sounds. A natural language processing system may derive meaning from the word inputs received from the ASR system. In various embodiments, the automatic speech recognition system may construct a predicted series of succeeding words from an incomplete series of words, where the words may be recognized as the sounds are received. The predicted series of words may be based on the probability of a particular word being the next word in the series of succeeding words. The probability of a particular word being the next word may be based on the derived context of the incomplete series of words, and may be calculated by a rich predictive model.

In one or more embodiments, a streaming ASR may recognize a sequence of words from a stream of sounds as a speaker speaks, where the ASR processing may be conducted in real time. An utterance may be a question, a statement, or a response that may be a complete sentence, a phrase, a clause, or a sound. The utterance may be provided by a speaker in response to a prompt or unprompted. Examples of an utterance may include, "I want to place an order."; "What time does flight 123 board?"; "Please, expedite shipping."; "in the afternoon", "1 2 3 4 5 6" for an account number; "yes"; "no"; or "repeat." An incomplete sequence of identified words may be used to predict the next words in the sequence. By utilizing derived context of the utterance to improve word identification and sentence construction, a complete series of words can be identified before a speaker has finished speaking an utterance. While a complete series of words, including predicted words, may be identified from calculated probabilities, the use of the context may be used to eliminate phonetically and grammatically proper choices of a complete statement to increase the likelihood of a correct interpretation and response to the speaker's utterance.

The NLU and NLP may use the complete series of words, including predicted words, to identify information, perform a query of data, and/or provide a response, where the response may be communicated back to the speaker. The NLP may process the complete series of words to identify the correct information and construct a response to be provided as a vocalization back to the speaker, where the identified information may be stored in a non-transitory memory and the response may be constructed utilizing natural language understanding (NLU). The NLP may provide a vocal communication through a natural language vocalization (NLV) generator to a speaker using an audio transducer (e.g., a speaker), where the communication may include the identified information and/or response. Information may include, for example, flight schedules, stock levels, shipping information, product lists, price lists, as well as other items associated with the particular speech interface use or business.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
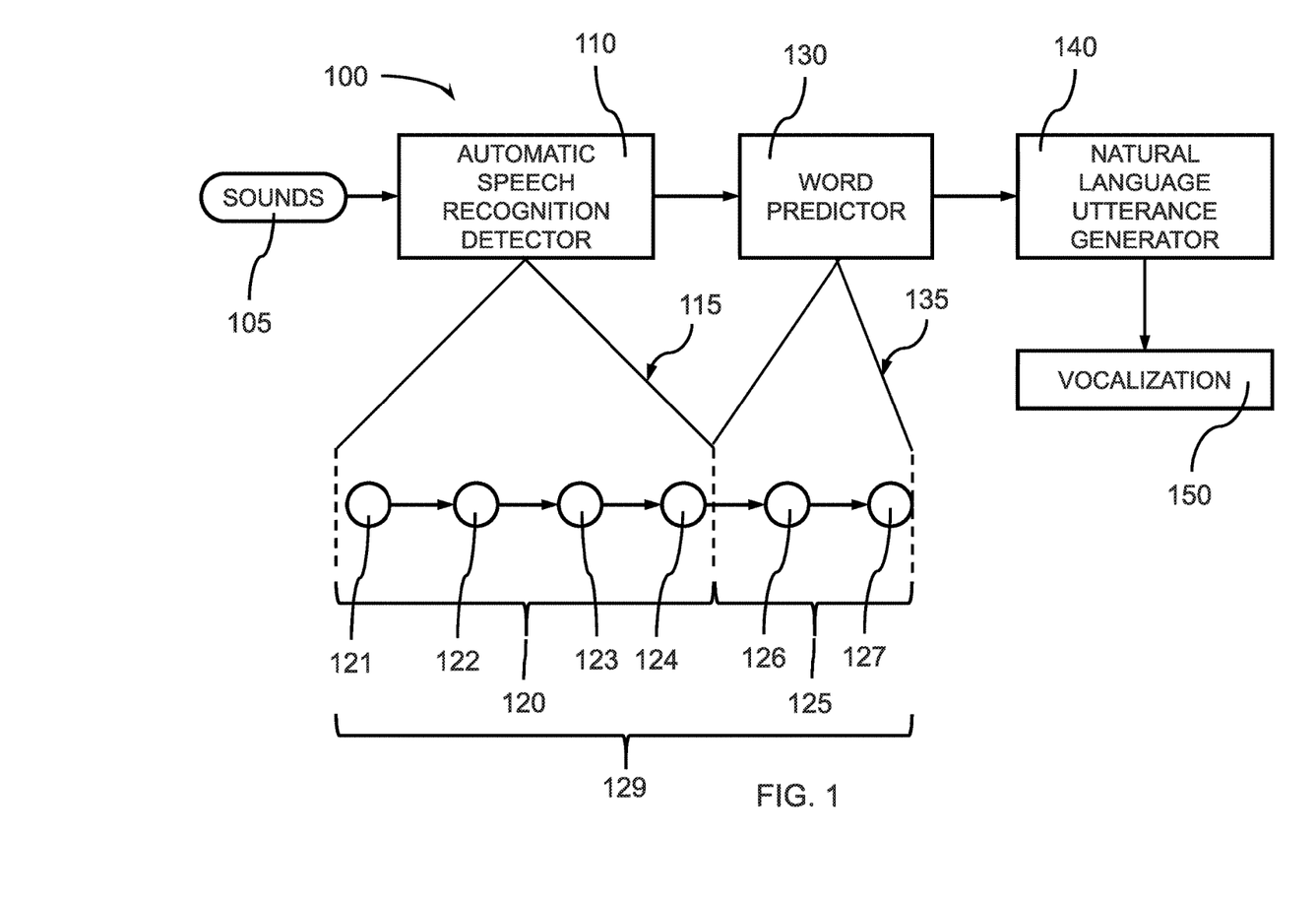
FIG. 1 is a block diagram of a speech interface according to an exemplary embodiment.

Referring now to the drawings in which like numerals represent the same or similar elements and initially to FIG. 1, which is a block diagram of a speech interface according to an exemplary embodiment.

In one or more embodiments, a speech interface 100 may include an automatic speech recognition (ASR) detector 110 and a natural language vocalization (NLV) generator 140, where the ASR performs automatic speech recognition on an utterance that may be a series of sounds or phones, and the NLV generator constructs a vocalization 150 from input provided by the word predictor 130. The word predictor 130 may model a remainder portion 125 using a processor based on a rich predictive model to predict the remainder portion 125.

In various embodiments, the automatic speech recognition (ASR) detector 110 receives a series of sounds 105, which may be provided by a speaker and detected by an audio sensor (e.g., a microphone). The ASR detector 110 may parse 115 the received sounds 105 to recognize one or more words 121, 122, 123, 124 associate with the parsed sounds, where the sounds may be parsed 115 by a processor in real time before the ASR detector 110 receives a complete utterance 129 from a speaker. In various embodiments, the ASR detector processes the received sounds (e.g., phones) as they arrive, and identifies a word associated with a set of sounds before a complete statement is received. The processor may be configured to construct a partially completed word sequence from the recognized words. A first word 121, may be recognized from a first set of sounds between a finite time after the first sounds begin to arrive to a finite time after the first parsed set of sounds end and a second set of sounds begin. Similarly, a second word 122 may be recognized from a second set of sounds between a finite time after the second sounds begin to arrive to a finite time after the second set of sounds end and a third set of sounds begin. This may be applied for each succeeding set of sounds to recognize each succeeding word 123, 124, etc. The words 121, 122, 123, 124 for the partially completed word sequence 120 may be recognized from the received portion of a speaker's partially received utterance based on pronunciation. The words may be stored in a dictionary, which may be stored in a computer memory.

In one or more embodiments, the word predictor 130 can predict 135 words 126, 127 that have not yet been recognized by the ASR detector 110, or for which sounds have not yet been received. In various embodiments, word prediction for words 126 and 127 can be much faster than word recognition utilizing ASR. By using a rich predictive model to provide a remainder portion 125 in response to the partially completed word sequence 120 to identify the complete series of words for the utterance 129, the speech interface's response time to the speaker's utterance can be reduced. In various embodiments, remainder portion 125 may be in the range of 1 word long to 4 words long, or in the range of 1 word long to 3 words long, in the range of 1 word long to 2 words long, or may be 1 word long. The accuracy of the prediction for the words 126, 127 of the remainder portion 125 may be improved by using a rich predictive model. In various embodiments, the rich predictive model may be trained with a training corpus, where the training corpus may include words and sentences with weighted probabilities for word occurrence. The rich predictive model may calculate word probabilities based on the training corpus.

In one or more embodiments, a rich predictive model may be a longer context n-gram model or a recurrent neural network model (RNN), where context information from the partially completed word sequence 120 may be used to calculate the probabilities for prediction of the words 126, 127 for the remainder portion 125. Natural language understanding may be applied by the word predictor 130 to determine an intended semantic or context from a partially received utterance. In various embodiments, the longer context n-gram model may be at least a trigram model, or at least a 4-gram model, at least a 5-gram model, or at least a 6-gram model. A Markov Model, for example a hidden Markov Model (HMM), may be used to model the probability of words 126, 127 forming the remainder portion 125. Feed forward neural networks (FFNN) or recurrent neural networks (RNN) may also calculate the probabilities of the remainder portion 125 based on the partially completed word sequence 120. A RNN may be a Long Short-Term Memory (LSTM), where the LSTM may be based on context information from dialogue sequence(s). The LSTM may encode a dialog history, where the dialog history may be generated by one or more speakers. The information recorded in the history may be leveraged to predict future words that have not yet been recognized. The rich predictive models may be trained as acoustic models for large vocabulary speech recognition.

In various embodiments, a word predictor 130, or features of a word predictor may be independent or may be incorporated into an ASR detector 110 and/or a natural language vocalization (NLV) generator 140.

In one or more embodiments, the natural language vocalization (NLV) generator 140 receives the partially completed word sequence 120 from the ASR detector 110 and the predicted words of the remainder portion 125 from the word predictor 130. The NLV generator 140 may apply natural language understanding to construct and communicate a vocalization 150, including one or more words or filler sounds (e.g., uh-huh, ok, hmm), based on the complete series of words for the utterance 129. The vocalization 150 constructed by the NLV generator 140 may be a question, a statement, or a response that may be a complete sentence, a phrase, a clause, a filler sound, or combinations thereof. The vocalization 150 may be provided to the speaker in response to a question or statement. Examples of a vocalization may include, "3:30 pm"; "Would you like to ship by FedEx® or UPS®?"; "Your appointment is for Tuesday afternoon."; "Your account number is 1 2 3 4 5 6. Is this correct?"; or "Hmm, I'm sorry, I did not understand." In various embodiments, the natural language vocalization generator is configured to convey the vocalization to a speaker in response to the received utterance.

In various embodiments, since the ASR detector 110 does not have to recognize every word from the sounds 105 received from the speaker before a vocalization 150 is constructed, the NLV generator 140 can construct the vocalization 150 with less delay, where the vocalization may be generated before a complete utterance is received from a speaker.

Figure 2:
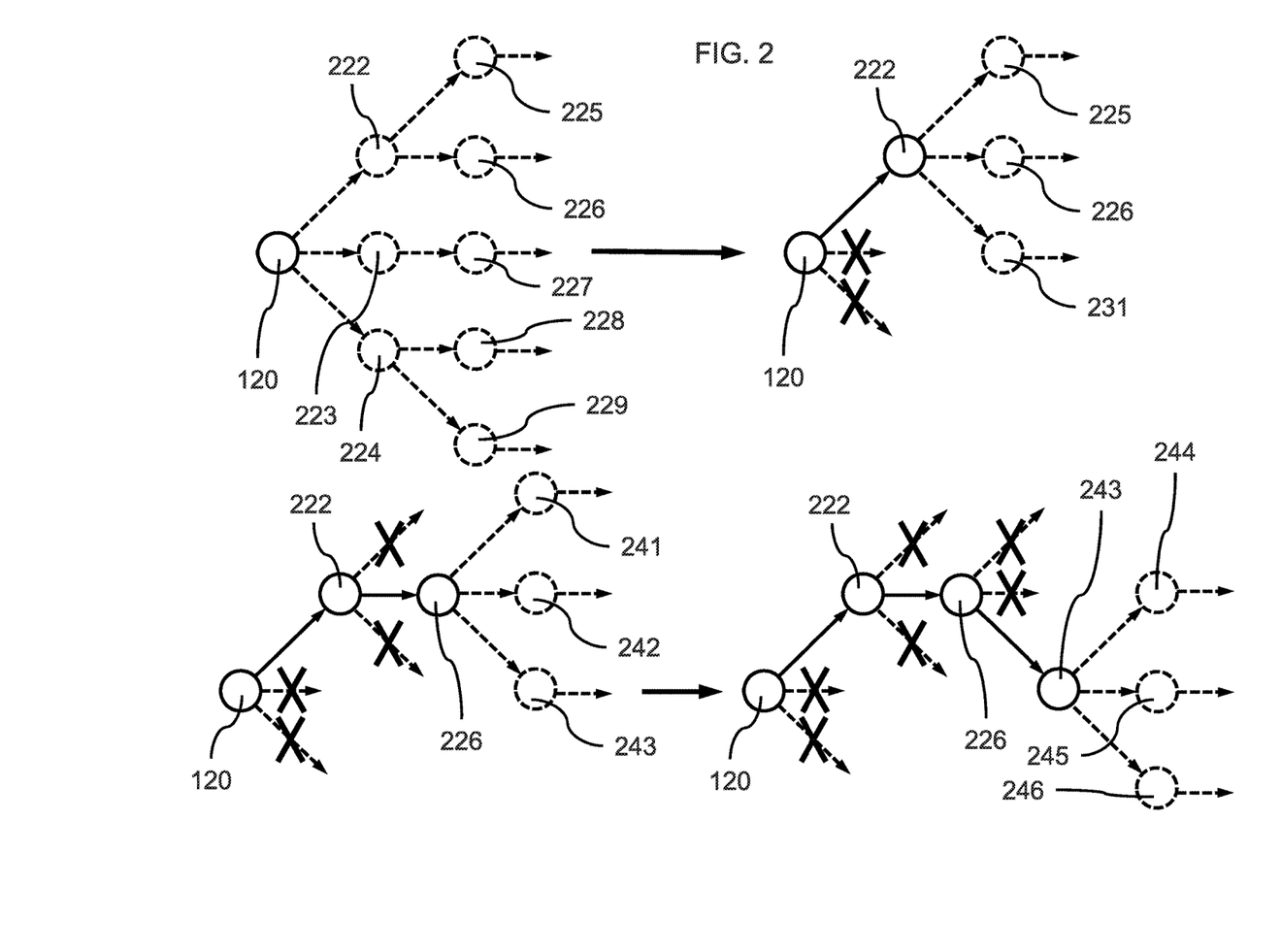
FIG. 2 is a diagram illustrating a function of a word predictor according to an exemplary embodiment.

FIG. 2 is a diagram illustrating a function of a word predictor according to an exemplary embodiment.

In one or more embodiments, a word predictor 130 may receive a partially completed word sequence 120, and identify one or more potential completion words 222, 223, 224 for predicted word 126 in a remainder portion 125, as shown in FIG. 1. A potential completion word 222 may be identified by a rich predictive model, such as a recurrent neural network model, as having the highest probability for being the next word in the remainder portion 125, and words 223 and 224 may be eliminated from being the next word in the remainder portion 125 based on lower probabilities.

In one or more embodiments, the probabilities may include the context of the speaker utterance (e.g., asking for information, providing an answer to a question, etc.), and take into account the purpose and function of the speech interface (e.g., making plane reservations, arranging product orders and shipment, logging service complaints, etc.), and past speaker history to calculate the probabilities. For example, "blueberries" has a much higher probability of being a correct predicted word 126 for a partially completed word sequence 120 including the words, "I would like to order one case of" for a blueberry farm than it would for a factory that produces threaded bolts.

In various embodiments, where remainder portion 125 includes a plurality of predicted words 126, 127, identification of predicted word 126 may be used to further refine the predictive model and identify one or more potential completion words 225, 226, 231 for predicted word 127, while eliminating the possibility of words 227, 228, and 229 being potential completion words. Similarly, identification of potential completion word 226 as the predicted word 127 can eliminate other potential completion words 225, 231 and alter the meaning/context of the remainder portion 125. The selection of predicted words from potential completion words 243, 244, 245, 246 may continue until a complete series of words for the utterance 129 is composed, where the utterance 129 may be considered complete when the meaning of the utterance 129 contains sufficient context and information for the NLV generator to prepare a vocalization in response. The NLV generator may use an only partially completed interpretation of the utterance to generate a vocalization 150 if the meaning and context is sufficient to generate the vocalization.

The sufficiency of the context and information for the NLV generator may be based on a threshold value calculated from a comparison with a set of one or more expected/predetermined utterances. For example, the produce farm may have expected/predetermined utterances: "cases of blueberries", "bushels of corn", "baskets of tomatoes", such that identification of the predicted word "cases" would increase the probability of the words "of blueberries" if no other product was sold by the case, and were the produce presently in season would have a higher probability than one out of season. Once an amount, e.g., "15", is identified from the partially completed word sequence 120 of a speaker's partially received utterance, and the predicted words "cases of blueberries" are identified as specifying the unit and product, the NLU may determine sufficient information has been provided to terminate further word prediction and to proceed to construction of a vocalization, for example, "There is sufficient inventory to complete your order." in response. The natural language understanding may be applied by the word predictor 130 to determine the context from an utterance.

Figure 3:
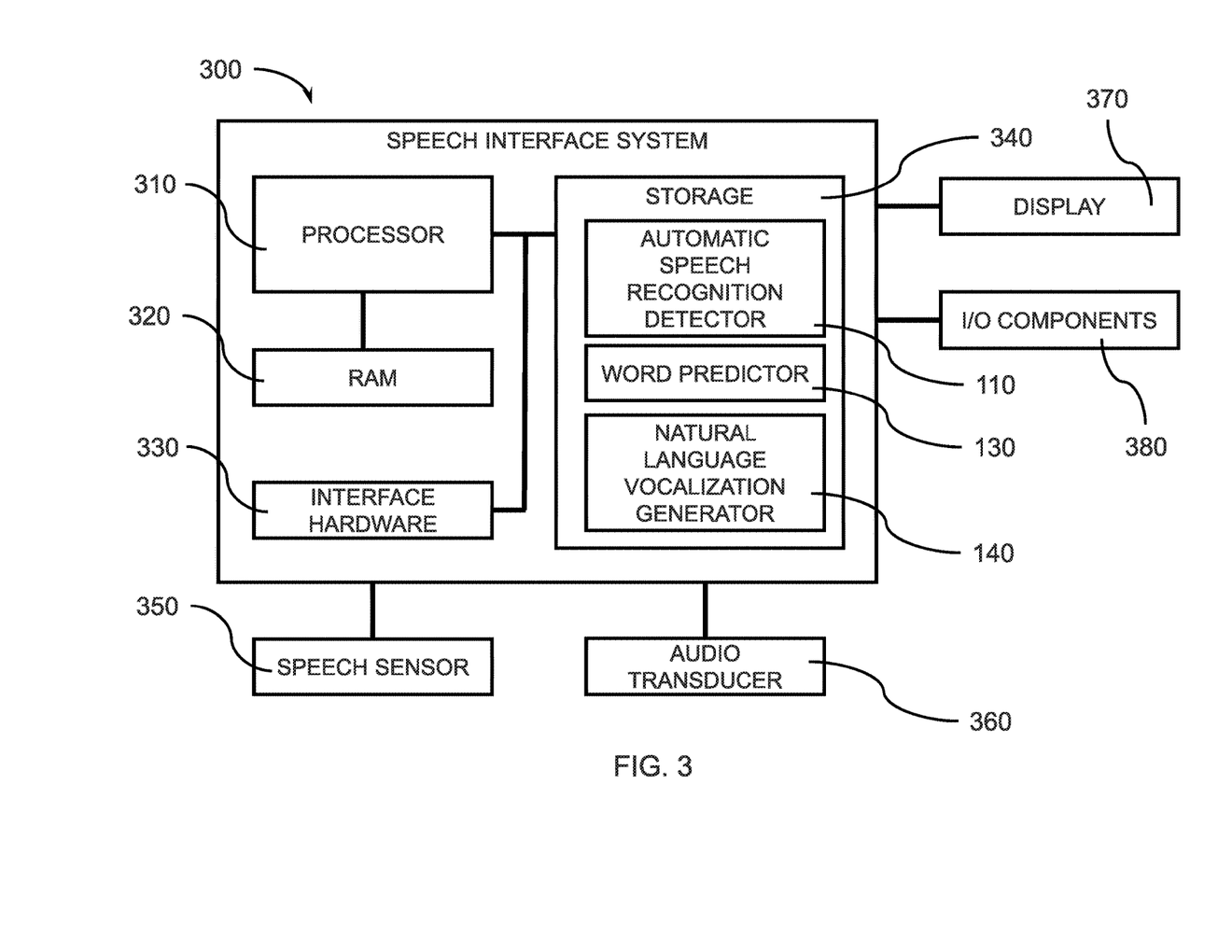
FIG. 3 is a block diagram of a speech interface system according to an exemplary embodiment.

FIG. 3 is a block diagram of a speech interface system according to an exemplary embodiment.

In one or more embodiments, a speech interface system 300 may include a processor 310, random access memory 320, and storage memory 340, where storage memory 340 may be non-volatile memory for storing at least program code and data. An automatic speech recognition detector 110, a word predictor 130, and/or a natural language vocalization generator 140 may be stored in storage memory 340, which may be non-transitory. The processor 310 may be configured to construct a partially completed word sequence from the recognized words implementing a speech recognition detector 110. The speech interface system 300 may also include one or more hardware interfaces for coupling with external devices including an audio/speech sensor 350 (e.g., a microphone) and an audio transducer 360 (e.g., a speaker) coupled to the speech interface system. The speech interface system 300 may also be coupled to one or more display devices 370 (e.g., monitor), and one or more input-output devices 380 (e.g., keyboard, mouse, etc.).

Figure 4:
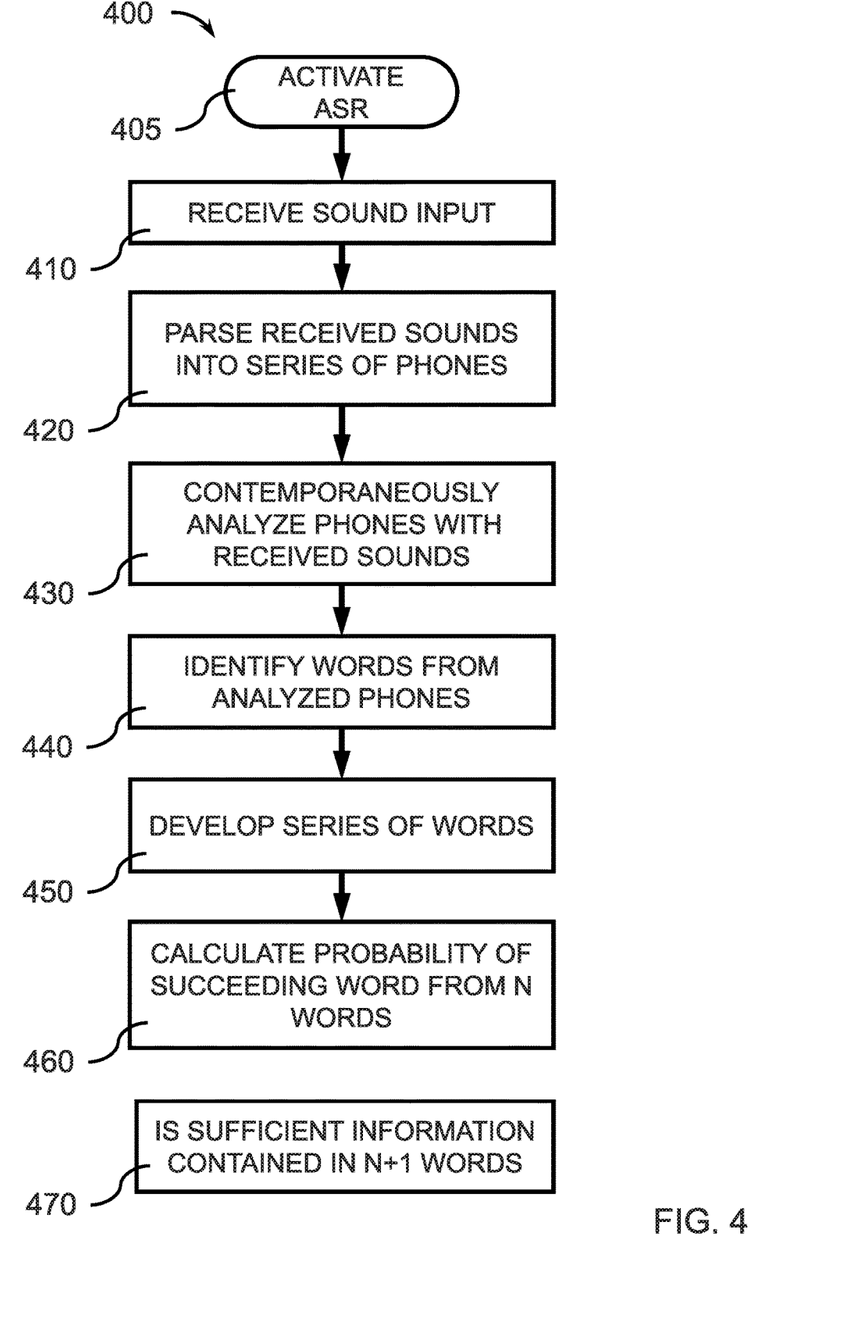
FIG. 4 is a block/flow diagram of a speech interface method according to an exemplary embodiment.

FIG. 4 is a block/flow diagram of a speech interface method 400 according to an exemplary embodiment.

In block 405, an automatic speech recognition detector is activated.

In block 410, an automatic speech recognition detector receives an input signal from a sensor for a stream of sound, which may be an utterance, and where the input signal may be an electrical signal received in real time, where real time indicates a negligible delay between the occurrence of the utterance and reception of the electrical signal. The automatic speech recognition detector may be coupled to a microphone for receiving the utterance as the generated electrical signal.

In block 420, the ASR detector parses the received signal into a series of phones that can be analyzed. The automatic speech recognition may recognize words one by one from an utterance received as a series of sounds. The automatic speech recognition detector may be configured to recognize the words using an acoustic model (AM) that maps sound waves to phones.

In block 430, the ASR detector analyzes the phones, while subsequent signals from the continuous stream of sounds are received. The recognition of words by the ASR may occur concurrently with the reception of the subsequent sounds. In various embodiments, the recognizing of one or more words for construction of a partially completed word sequence 120 from the received electrical signal occurs concurrently with reception of the electrical signal.

In block 440, one or more phones may be used to identify words. A dictionary, which may be stored in a computer memory, may map the sequence of phones to a word through identification of separate phones in the stream of sound.

In block 450, as subsequent words are identified, a series of words may be concatenated to develop a partially completed word sequence 120. A language model (LM) may compute the probability of a word sequence, where the language model may be a part of a word predictor 130. The computations and searching (e.g., of the dictionary) may be conducted concurrently to generate the word sequence.

In various embodiments, a phone sequence may not be treated or represented explicitly as speech recognition results, such that an utterance is directly conveyed into recognized words by the ASR.

In block 460, the 'n' concatenated words of the partially completed word sequence 120 may be analyzed by a word predictor 130 to determine probabilities for the succeeding word. A word predictor 130 may include NLU and NLP for predicting succeeding word(s). The probabilities of a plurality of succeeding words may be compared and ranked hierarchically to identify one or more words with the highest probabilities. The one or more words with the highest probabilities may be analyzed based on the context of the partially completed word sequence 120 and/or context of the usage of the speech interface 100 to predict the succeeding word. In various embodiments, a rich predictive model may be used to calculate the probabilities for the one or more words. A rich predictive model may be trained with a training corpus for an automatic speech recognition detector, where the ASR training corpus may include specified utterances to be learned. A training corpus may be stored in computer memory.

In block 470, The combination of the partially completed word sequence 120 and the one or more predicted words is analyzed to determine if sufficient information is contained in the string of words including the partially completed word sequence 120 and the one or more predicted words to prepare a responsive vocalization by a NLV generator 140. If the analysis indicates that sufficient information is contained within the string of words, the string may be inputted to the NLV generator to prepare a vocalization. The vocalization may be conveyed to a speaker by an audio transducer (e.g., speaker). A natural language vocalization generator 140 may be trained with a training corpus, where the vocalization training corpus may include specified vocalizations to be learned. The training corpus for the automatic speech recognition detector and the training corpus for the natural language vocalization generator may be stored in a non-transitory memory.

Figure 5:
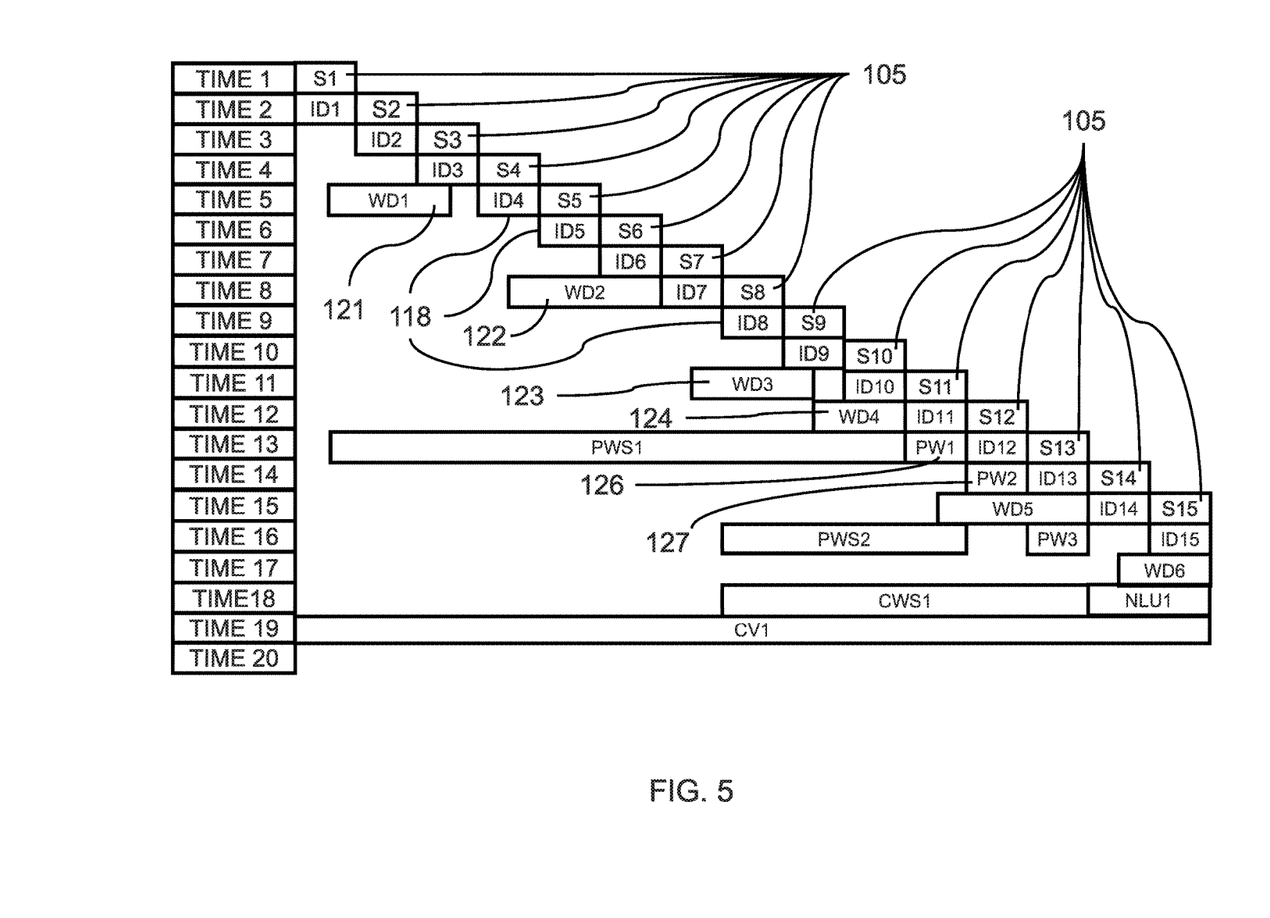
FIG. 5 is a diagram of a process for preparing a vocalization from received sounds of an utterance according to an exemplary embodiment.

FIG. 5 is a diagram of a process for preparing a vocalization from received sounds of an utterance according to an exemplary embodiment.

In one or more embodiments, sounds 105 (indicated by blocks S1 to S15) may be received as a continuous stream from an audio sensor and inputted into an automatic speech recognition (ASR) detector. (While blocks S1 to S15 are shown as interrupted and staggered, this is for descriptive purposes only, and should be understood to be a continuous stream of sound.) A first portion S1 of the sounds may be received between time 1 and time 2; a second contiguous portion S2 may be received between time 2 and time 3; etc. A series of phones 118 may be parsed from the sounds 105 by the ASR detector 110, where a phone ID1 may be identified for sound portion S1, a phone ID2 for sound portion S2, etc.

In various embodiments, the ASR detector 110 may recognize words 121, 122, 123, 124 from a plurality of phones 118, where one or more phones 118 may be used to identify a word. The ASR detector may analyze the phones 118 sequentially as the sound 105 is streaming, and identify words, for example WD1, from the concatenation of the parsed phones, ID1, ID2, ID3. The ASR detector 110 may begin the process of identifying a word, WD1, a finite time after a phone is recognized but before the entire utterance of the particular word is completed, as shown by the left edge of the block for WD1 occurring approximately in the middle of phone ID1. A word, WD1, may be fully identified based on a partial sequence of phones, ID1, ID2, before the final phone is completely identified based on the uniqueness of the phones ID1, ID2, and ID3 making up word, WD1. This may further reduce the response time by freeing the ASR detector 110 to work on subsequent sounds, S4, S5, and S6. Alternately, a word 122, may require the entire sequence of phones ID4, ID5, and ID6 to be analyzed before a word, WD2, may be specifically identified at time 8.

In one or more embodiments, for example, a partial word sequence, PWS1, may be constructed from words WD1, WD2, WD3, and WD4, and inputted into word predictor 130 for a 4-gram analysis to identify predicted word PW1 at time 13. By waiting for words WD1, WD2, WD3, and WD4 to conduct the 4-gram analysis, word predictor 130 can provide more accurate word predictions for PW1, PW2, and PW3. Similarly, a recurrent neural network model can provide more accurate word predictions for PW1, PW2, and PW3. The word predictor 130 may identify a statistically likely word, PW1, before ASR detector 110 recognizes the word. This allows leveraging of ASR while maintaining the accuracy of the word predictor through NLU.

In an embodiment utilizing an n-gram analysis, 'n' words may be required to be recognized by ASR detector 110 before word predictor 130 may identify potential words 126, 127. As shown in FIG. 5, the block for the first predicted word, PW1, is shown as the same length as phone ID11 to indicate that word predictor 130 can analyze the partially completed word sequence 120 and predict word PW1 faster than the ASR detector can recognize word WD5 from a sequence of phones. As shown in blocks PW1, PW2, and PW3, three words may be predicted by word predictor 130 before WD5, corresponding to PW1 is recognized by ASR detector 110.

In various embodiments, NLV generator 140 is not delayed by the ASR detector 110 processing incoming sounds because word predictor 130 can provide a remainder portion 125 in response to the partially completed word sequence 120 before all sounds, S1-S15 for the complete utterance 129 are received from a speaker. A completed word sequence can be constructed from the partially completed word sequence PWS1 including words WD1, WD2, WD3, and WD4, and the predicted words PW1, PW2, and PW3. The NLV generator 140 can begin processing the partially completed word sequence 120 and remainder portion 125 including the predicted words at time 18. In various embodiments, the NLV generator 140 can begin preparing a vocalization 150 before the complete utterance 129 is received, and provide a vocalization 150 as a response to the speaker when the utterance 129 is completed.

In various embodiments, the word predictor 130 can generate more accurate predicted words 126, 127 utilizing the rich predictive model faster than the ASR detector 110 can recognize a complete utterance 129. The word predictor 130 may use a richer model than the model used for ASR.

Figure 6:
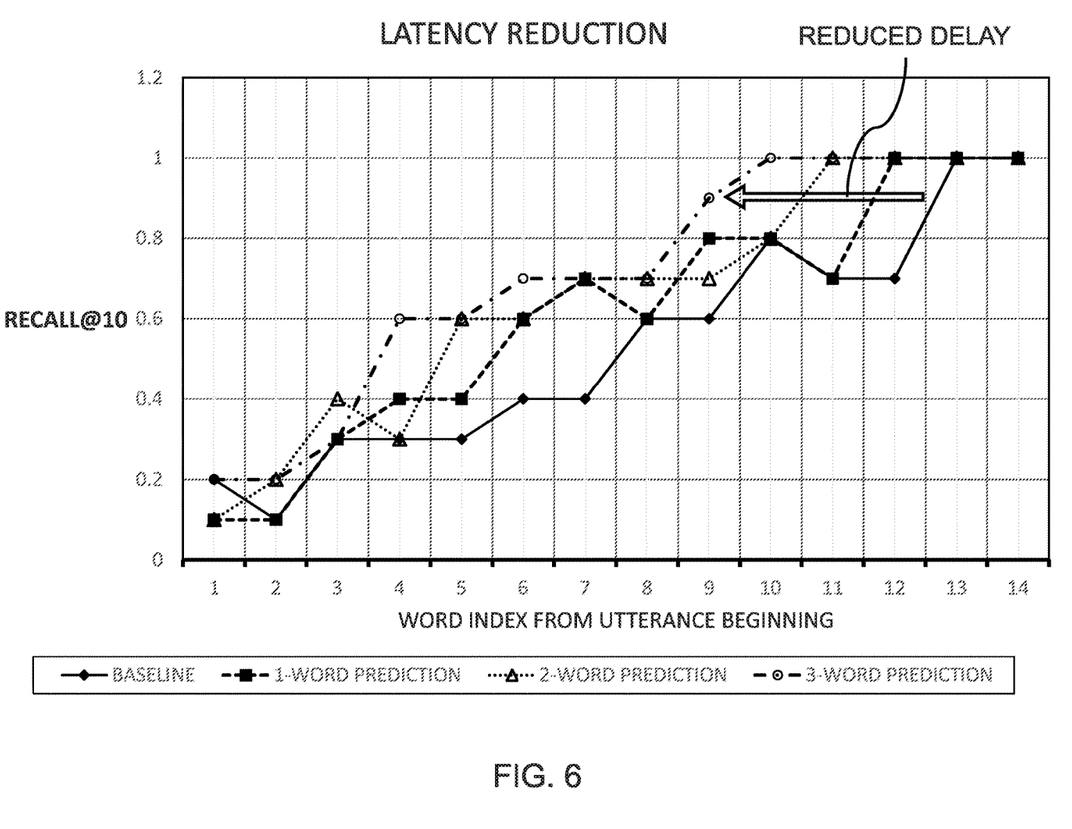
FIG. 6 is a graph of experimental results showing a reduced processing delay according to an exemplary embodiment.

FIG. 6 is a graph of experimental results showing a reduced processing delay according to an exemplary embodiment.

The reduction in delay is shown between a baseline method utilizing a serial ASR and NLU process using a batch ASR, and a concurrent ASR and NLU process providing 1-word prediction, 2-word prediction, and 3-word prediction. The horizontal axis of FIG. 6 indicates the number of words recognized by ASR from the beginning of the utterance (e.g., sentence), and the vertical axis indicates the value for the Recall@10, when an intermediate ASR result up to the corresponding word index and/or predicted words are used for natural language understanding. Recall@10 is the coverage ratio of the top 10 results from the natural language understanding by the intermediate ASR result up to the corresponding word index and/or predicted words over the top 10 results from natural language understanding by the whole ASR result from the beginning to the end. A Recall@10 value of 1.0 indicates that there is a 100% likelihood that the actual word(s) for completing an utterance are included in the top 10 results from the natural language understanding. As may be seen, the baseline requires all words (13 words in FIG. 6) of an utterance to be recognized before formulating a response, whereas a rich predictive model may provide for formulating a response with a 90% accuracy after recognizing only 9 words with the associated reduction in time delay.

Figure 7:
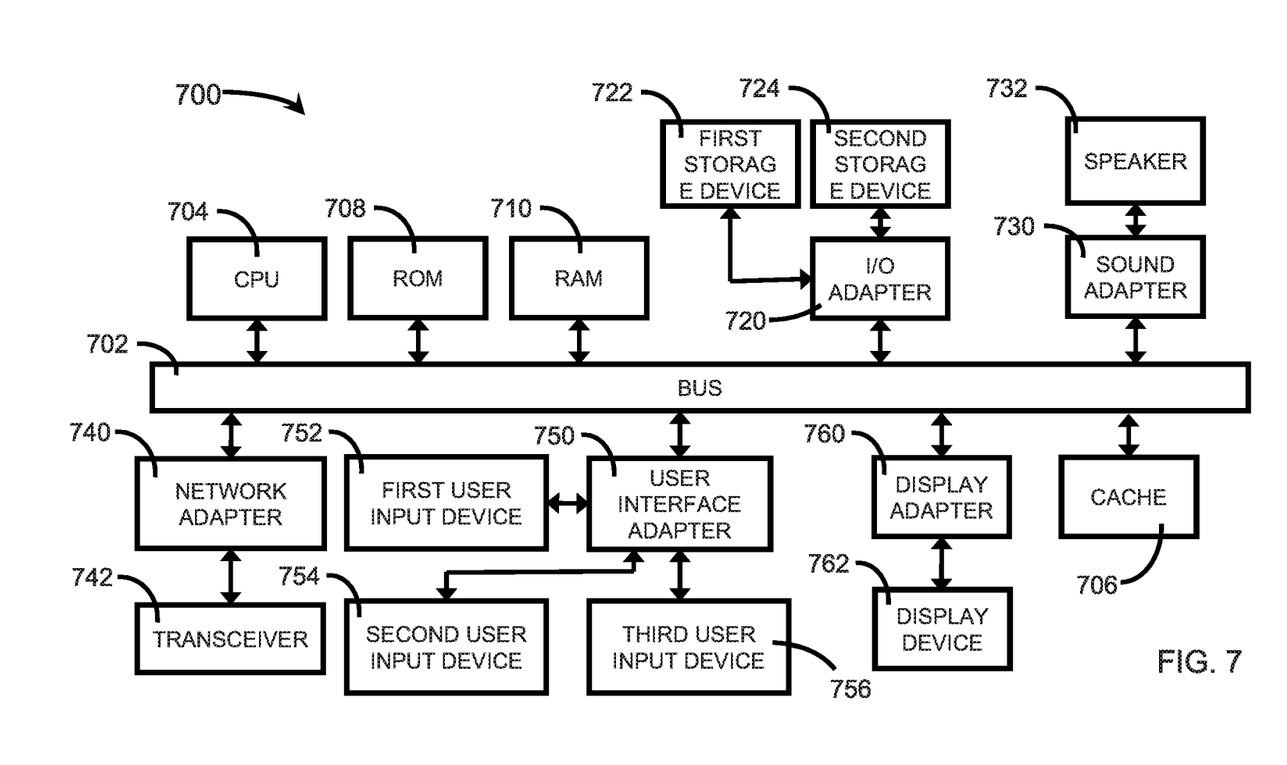
FIG. 7 is an exemplary processing system to which the present principles may be applied in accordance with an embodiment of the present disclosure.

FIG. 7 is an exemplary processing system 700 to which the present principles may be applied in accordance with an embodiment of the present disclosure. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 230. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Moreover, it is to be appreciated that system 700 is a system for implementing respective embodiments of the present principles. Part or all of processing system 700 may be implemented in one or more of the elements of FIG. 3.

Further, it is to be appreciated that processing system 700 may perform at least part of the method described herein including, for example, at least part of method 400 of FIG. 4.

An aspect of the disclosure relates to a method for reducing response time in speech interfacing comprising constructing a partially completed word sequence from a partially received utterance, predicting a remainder portion based on the partially completed word sequence using a rich predictive model, and providing the partially completed word sequence and the predicted remainder portion to a natural language vocalization generator for preparation of a vocalization, wherein the vocalization is prepared before a complete utterance is received.

Another aspect of the disclosure relates to a non-transitory computer readable storage medium comprising a computer readable program for reducing response time in a speech interface, wherein the computer readable program when executed on a computer causes the computer to perform the steps of constructing a partially completed word sequence, predicting a remainder portion based on the partially completed word sequence using a rich predictive model, and providing the partially completed word sequence and the predicted remainder portion to a natural language vocalization generator for preparation of an vocalization.

Another aspect of the disclosure relates to a system for reducing response time in speech interfacing including an automatic speech recognition detector configured to construct a partially completed word sequence, a word predictor configured to predict a remainder portion based on the partially completed word sequence using a rich predictive model, and a natural language vocalization generator configured to receive the partially completed word sequence and the predicted remainder portion and prepare an vocalization.

Having described preferred embodiments of an approach to reducing the response time of a speech interface (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for reducing response time in a speech interface comprising:
    constructing a partially completed word sequence from a partially received utterance;
    modeling a remainder portion for the partially received utterance using a processor based on a rich predictive model to predict the remainder portion; and
    responding to the partially completed word sequence and the predicted remainder portion for the partially received utterance with a vocalization, wherein the vocalization is prepared before a complete utterance is received from a speaker and conveyed to the speaker by an audio transducer.

2. The method according to claim 1, wherein the rich predictive model is trained with a training corpus for an automatic speech recognition detector.

3. The method according to claim 1, further comprising using a natural language vocalization generator to respond with the vocalization, wherein the natural language vocalization generator uses the partially completed word sequence and the predicted remainder portion for information retrieval from a non-transitory memory.

4. The method according to claim 1, further comprising identifying words in the partially received utterance utilizing a context of the utterance to improve word identification.

5. The method according to claim 1, further comprising receiving an electrical signal at an automatic speech recognition detector, wherein the electric signal is received in real time from an audio sensor receiving the utterance from the speaker.

6. The method according to claim 5, further comprising recognizing one or more words for construction of the partially completed word sequence from the received electrical signal concurrently with reception of the electrical signal.

7. The method according to claim 6, further comprising conveying the vocalization to a speaker in response to the received complete utterance.

8. A non-transitory computer readable storage medium comprising a computer readable program for reducing response time in a speech interface, wherein the computer readable program when executed on a computer causes the computer to perform the steps of:
    constructing a partially completed word sequence from a partially received utterance;
    modeling a remainder portion for the partially received utterance using a processor based on a rich predictive model to predict the remainder portion; and
    responding to the partially completed word sequence and the predicted remainder portion for the partially received utterance with a vocalization, wherein the vocalization is prepared before a complete utterance is received from a speaker and conveyed to the speaker by an audio transducer.

9. The computer readable storage medium of claim 8, wherein the computer readable program when executed on a computer causes the computer to: train the predictive model with a training corpus for an automatic speech recognition detector.

10. The computer readable storage medium of claim 8, wherein the computer readable program when executed on a computer causes the computer to: identify words in the partially received utterance utilizing a context of the utterance to improve word identification.

11. The computer readable storage medium of claim 8, wherein the computer readable program when executed on a computer causes the computer to: receive an electrical signal at an automatic speech recognition detector, wherein the electric signal is received in real time from an audio sensor receiving the utterance from the speaker.

12. A system for reducing response time in a speech interface comprising:
    an automatic speech recognition detector including a processor configured to construct a partially completed word sequence from a partially received utterance;
    a word predictor configured to model a remainder portion for the partially received utterance using a processor based on a rich predictive model to predict the remainder portion; and
    a natural language vocalization generator configured to respond to the partially completed word sequence and the predicted remainder portion for the partially received utterance with a vocalization, wherein the vocalization is prepared before a complete utterance is received from a speaker and conveyed to the speaker by an audio transducer.

13. The system according to claim 12, wherein the rich predictive model is trained with a training corpus for an automatic speech recognition detector.

14. The system according to claim 12, further comprising a natural language vocalization generator, wherein the natural language vocalization generator uses the partially completed word sequence and the predicted remainder portion for information retrieval.

15. The system according to claim 12, wherein the automatic speech recognition detector is configured to identify words in the partially received utterance utilizing a context of the utterance to improve word identification.

16. The system according to claim 12, wherein the automatic speech recognition detector is coupled to an audio sensor to receive an electrical signal, wherein the electric signal is generated by the utterance from the speaker, and parse the received signal into a series of phones that can be analyzed concurrently with reception of the electrical signal.

17. The system according to claim 16, wherein the word predictor is configured to model a remainder portion based on a probability of a particular word being a next word, wherein the probability of the next word is based in part on a context of the partially received utterance.

18. The system according to claim 17, wherein the natural language vocalization generator is configured to convey the vocalization to the speaker in response to the received complete utterance.

19. The system according to claim 18, wherein the system for reducing response time in speech interfacing further comprises non-transitory memory, and the vocalization to the speaker includes information retrieved from the non-transitory memory.

20. The system according to claim 19, wherein the probability of the next word is calculated using the rich predictive model.

\* \* \* \* \*